United States Patent
Long et al.

(10) Patent No.: US 11,390,725 B2
(45) Date of Patent: Jul. 19, 2022

(54) POLYETHERETHERKETONE COMPOSITE AND METHOD OF PREPARING SAME

(71) Applicant: Changsha University of Science and Technology, Hunan (CN)

(72) Inventors: Chunguang Long, Hunan (CN); Ying Peng, Hunan (CN); Xin Peng, Hunan (CN)

(73) Assignee: CHANGSHA UNIVERSITY OF SCIENCE AND TECHNOLOGY, Hunan (CN)

( * ) Notice: Subject to any disclaimer, the term of this patent is extended or adjusted under 35 U.S.C. 154(b) by 0 days.

(21) Appl. No.: 17/061,224

(22) Filed: Oct. 1, 2020

(65) Prior Publication Data

US 2021/0179805 A1 Jun. 17, 2021

(30) Foreign Application Priority Data

Dec. 11, 2019 (CN) .......................... 201911272196.9

(51) Int. Cl.
| | | |
|---|---|---|
| *C08K 3/08* | (2006.01) | |
| *C08K 3/04* | (2006.01) | |
| *C08K 5/134* | (2006.01) | |
| *C08L 61/16* | (2006.01) | |
| *B22F 9/04* | (2006.01) | |
| *B22F 9/08* | (2006.01) | |
| *C22C 18/04* | (2006.01) | |
| *B29C 43/00* | (2006.01) | |

(52) U.S. Cl.
CPC ................ *C08K 3/08* (2013.01); *C08K 3/042* (2017.05); *C08K 5/1345* (2013.01); *C08L 61/16* (2013.01); *B22F 9/04* (2013.01); *B22F 9/082* (2013.01); *B22F 2009/043* (2013.01); *B22F 2301/30* (2013.01); *B29C 43/003* (2013.01); *C08K 2003/0812* (2013.01); *C08K 2003/0893* (2013.01); *C08L 2201/08* (2013.01); *C22C 18/04* (2013.01)

(58) Field of Classification Search
CPC .... C08K 2003/0812; C08K 2003/0893; C08K 3/042; C08L 61/16
See application file for complete search history.

*Primary Examiner* — Wenwen Cai
(74) *Attorney, Agent, or Firm* — Berenato & White, LLC

(57) ABSTRACT

The invention provides a polyetheretherketone (PEEK) composite and a method of preparing same. The PEEK composite is prepared from 55-90 parts by mass of PEEK, 5-30 parts by mass zinc aluminum (ZA) alloy, 5-15 parts by mass graphite, 0.3-1 parts by mass graphene oxide (GO) and a processing additive. The PEEK composite is prepared by the following steps: putting the ZA alloy into an aqueous solution of a quaternary ammonium salt surfactant, ultrasonically dispersing, filtering, washing and drying; dissolving the GO in deionized water, dispersing the ZA alloy in deionized water, and adding a GO solution dropwise to a ZA alloy dispersion to obtain a GO/ZA alloy complex; mixing the PEEK, the GO/ZA alloy complex, the graphite and the processing additive, and drying at 100-120° C. for 3-4 h; and mixing in a mixer, and carrying out compression molding at 380-400° C.

9 Claims, No Drawings

POLYETHERETHERKETONE COMPOSITE AND METHOD OF PREPARING SAME

CROSS-REFERENCE TO RELATED APPLICATIONS AND CLAIM TO PRIORITY

This application is related to CN Patent Application No. 201911272196.9 filed Dec. 11, 2019, the invention of which is incorporated herein by reference and to which priority is claimed.

FIELD OF THE INVENTION

The invention relates to the field of new materials, in particular to a polyetheretherketone (PEEK) composite with high thermal conductivity and wear resistance and a method of preparing same.

BACKGROUND OF THE INVENTION

Polyetheretherketone (PEEK) is a polymer composed of repeating units with one ketone bond and two ether bonds in the main chain structure. PEEK has high temperature resistance and chemical corrosion resistance. It is a semi-crystalline polymer material with a melting point of 334° C., a softening point of 168° C., and a tensile strength of 132-148 MPa. It can be used as a high temperature resistant structural material and electrical insulation material and can be combined with glass fiber or carbon fiber to prepare a reinforcing material. PEEK is generally a type of polyarylether polymer obtained by condensation with aromatic dihydric phenol.

PEEK has rigidity and flexibility, especially outstanding fatigue resistance under alternating stress, which is comparable to that of alloy materials.

PEEK has excellent sliding properties and is suitable for applications where low friction coefficient and wear resistance are required. In particular, PEEK modified with carbon fiber, graphite, and polytetrafluoroethylene (PTFE) has excellent wear resistance.

Except for concentrated sulfuric acid, PEEK is insoluble in solvents, strong acids and alkalis, and has hydrolysis resistance and high chemical stability.

Because PEEK has good high temperature fluidity and a high thermal decomposition temperature, it can be processed in a variety of ways, for example, injection molding, extrusion molding, compression molding, melt spinning, etc.

Therefore, PEEK offers excellent properties such as self-lubricity, acid and alkali resistance, friction resistance, fatigue resistance, high strength, and easy processing.

However, PEEK has poor thermal conductivity, a high friction coefficient and excessive wear loss, which limits its use in the engineering field.

SUMMARY OF THE INVENTION

An objective of the invention is to provide a polyetheretherketone (PEEK) composite with excellent thermal conductivity, wear resistance and self-lubricity and a method of preparing same.

According to one aspect of the invention, a PEEK composite is provided. The PEEK composite is prepared from about 55-90 parts by mass of PEEK, about 5-30 parts by mass of zinc aluminum (ZA) alloy, about 5-15 parts by mass of graphite, about 0.3-1 parts by mass of graphene oxide (GO) and a processing additive. The ZA alloy is prepared from the following raw materials: about 90.5-91.1 parts by mass of zinc, about 8.5-8.6 parts by mass of aluminum, about 1.1-1.2 parts by mass of copper, and iron and magnesium impurities included in the production materials. The melting point of the ZA alloy is 360-400° C. The ZA alloy is made into powder by a smelting-nitrogen atomization method, and then flake-like alloy powder is made by a wet ball milling method. The PEEK composite is prepared by the following steps:

putting the ZA alloy powder into an aqueous solution of a quaternary ammonium salt surfactant, ultrasonically dispersing for more than 30 min, filtering, washing with deionized water and drying;

ultrasonically dispersing and dissolving the GO in deionized water, ultrasonically dispersing the ZA alloy processed by the above step in deionized water, and adding a GO solution dropwise to the ZA alloy dispersion under stirring, and filtering and drying after the solution is stratified, to obtain a GO/ZA alloy complex;

mixing the PEEK, the GO/ZA alloy complex, the graphite and the processing additive, and drying at 100-120° C. for 3-4 h; and mixing the dried materials in a mixer, and carrying out compression molding at 380-400° C.

The quaternary ammonium salt surfactant may be cetyl dimethyl ammonium bromide, cetyl trimethyl ammonium chloride, octadecyl trimethyl ammonium chloride, dodecyl dimethyl benzyl ammonium chloride, etc.

According to a preferred embodiment, the GO is prepared by oxidation-exfoliation of graphite by a Hummers method.

According to another preferred embodiment, the GO is ultrasonically dispersed for more than 3 h and dissolved, and after the ultrasonic dispersion and dissolution, a concentration of the GO is 0.01 g/mL.

According to another preferred embodiment, the processing additive includes at least one of a lubricant and an antioxidant. The lubricant includes about 0.2-0.3 parts by mass of silicone oil or/and about 0.2-0.3 parts by mass of polytetrafluoroethylene (PTFE). The antioxidant includes about 0.1-0.2 parts by mass of antioxidant 1010 or/and about 0.1-0.2 parts by mass of antioxidant 168.

According to another preferred embodiment, the preparation of the PEEK composite further includes the following steps: heating the ZA alloy powder washed with deionized water to 100-110° C., stirring and drying for about 10-15 min until a water content of the ZA alloy is less than 0.3%, putting the ZA alloy into a high-speed mixer, adding an aluminate coupling agent DL-411 that is 0.8 wt % to 1.2 wt % of the ZA alloy powder, and blending for about 3-5 min. The DL-411 series aluminate coupling agent increases the interface bonding strength of the ZA alloy and the PEEK and improves the mechanical properties and thermal conductivity of the material.

According to another preferred embodiment, the PEEK, the GO/ZA alloy complex, the graphite and the processing additive are dried at 120° C. for 3 h after being mixed.

Another aspect of the invention provides a method for preparing a PEEK composite, including the following steps:

preparing a ZA alloy: preparing a ZA alloy powder by a smelting-nitrogen atomization method from about 90.5-91.1 parts by mass of zinc, about 8.5-8.6 parts by mass of aluminum, about 1.1-1.2 parts by mass of copper, and iron and magnesium impurities included in the production materials, and then preparing a flake-like ZA alloy powder by a wet ball milling method, where the melting point of the ZA alloy is 360-400° C.;

putting about 5-30 parts by mass of the flake-like ZA alloy powder into an aqueous solution of a quaternary ammonium salt surfactant, ultrasonically dispersing for more than 30 min, filtering, washing with deionized water and drying;

ultrasonically dispersing and dissolving about 0.3-1 parts by mass of GO in deionized water, ultrasonically dispersing the ZA alloy processed by the above step in deionized water, and adding a GO solution dropwise to a ZA alloy dispersion under stirring, and filtering and drying after the solution is stratified, to obtain a GO/ZA alloy complex;

mixing about 55-90 parts by mass of PEEK, the GO/ZA alloy complex obtained in the above step, about 5-15 parts by mass of graphite and an appropriate amount of processing additive, and drying at 100-120° C. for 3-4 h; and mixing the dried materials in a mixer, and carrying out compression molding at 380-400° C.

The quaternary ammonium salt surfactant may be cetyl dimethyl ammonium bromide, cetyl trimethyl ammonium chloride, octadecyl trimethyl ammonium chloride, dodecyl dimethyl benzyl ammonium chloride, etc.

According to a preferred embodiment, the GO is prepared by oxidation-exfoliation of graphite by a Hummers method. The GO is ultrasonically dispersed for more than 2 h and dissolved, and after the ultrasonic dispersion and dissolution, the concentration of the GO is 0.01 g/mL. The ZA alloy is ultrasonically dispersed in the deionized water to obtain a ZA alloy dispersion with a concentration of 0.1 g/ml. The quaternary ammonium salt surfactant has long hydrophobic carbon chains and positively charged polar ends. After the ZA alloy powder is added to the aqueous solution of the quaternary ammonium salt surfactant, the quaternary ammonium salt surfactant is adsorbed on the surface of the ZA alloy through van der Waals forces and network association, making the surface of the ZA alloy positively charged. As the GO is negatively charged, under the action of opposite charges, the GO is easier to adsorb on the surface of the ZA alloy to form a GO coating on the surface of the ZA alloy. In this way, the interface between the ZA alloy and the PEEK is better bonded, thereby improving the overall performance of the material.

According to another preferred embodiment, the processing additive includes at least one of a lubricant and an antioxidant. The lubricant includes about 0.2-0.3 parts by mass of silicone oil or/and about 0.2-0.3 parts by mass of PTFE. The antioxidant includes about 0.1-0.2 parts by mass of antioxidant 1010 or/and about 0.1-0.2 parts by mass of antioxidant 168.

According to another preferred embodiment, the method for preparing a PEEK composite of the invention further includes the following steps: heating the ZA alloy powder washed with deionized water to 100-110° C., stirring and drying for about 10-15 min until the water content of the ZA alloy is less than 0.3%, putting the ZA alloy into a high-speed mixer, adding an aluminate coupling agent DL-411 that is 0.8 wt % to 1.2 wt % of the ZA alloy powder, and blending for 3-5 min.

The above preferred embodiments may be implemented individually or in combination without conflict.

The invention has the following beneficial effects:

The ZA alloy in the composition has excellent wear resistance and mechanical properties. The alloy powder is made by a smelting-nitrogen atomization method, and the flake-like alloy powder is made by a wet ball milling method. The flake-like structure produces layer-to-layer slip during the friction process to improve the tribological properties of the material and cooperates with the PEEK and the lubricant to reduce friction. The prepared ZA alloy has a similar melting point as the PEEK and has good fluidity, thereby being compatible with the PEEK. The ZA alloy is used as a filler to modify the PEEK to obtain a modified PEEK with a melting point similar to that of the PEEK but with better performance.

The physical and chemical properties of graphite are special. In particular, graphite has a flake-like structure, which has high thermal conductivity and a low friction coefficient. After the graphite is added to the polymer, it improves the thermal conductivity and reduces the friction coefficient.

GO has a high specific surface area and abundant functional groups on the surface. Compared with graphene, GO is a single layer and is not prone to agglomeration. It has a large number of oxygen-containing groups on the surface, which achieve good interface bonding with the ZA alloy. GO possesses good water solubility, dispersibility and wetting properties in addition to the original properties of graphene. It produces good interface bonding with PEEK during use, reduces the interface's thermal resistance, and improves the thermal conductivity of the material. GO is easy to be used as a filler for molding processing, and synergistically improves the thermal conductivity of the composite. Meanwhile, in the friction and wear process, GO more easily forms a transfer film, which improves the self-lubricity of the composite, reduces the wear loss, and improves the wear resistance of the composite.

The ZA alloy is filled into the PEEK to bear the load, reduce the pressure, reduce the deformation of the material under friction, and improve the mechanical properties of the material. Meanwhile, the ZA alloy increases the glass transition temperature of the PEEK and improves the high temperature friction performance of the PEEK. The GO is used to coat the flake-like ZA alloy, so that the interface between the filler and the PEEK matrix is better bonded. The flake-like ZA alloy is also conducive to forming a thermal network channel, improving the thermal conductivity of the composite. In this way, the excellent mechanical properties of the metal are combined with the excellent tribological properties of the PEEK to obtain a new polymer-based metal composite with excellent tribological and mechanical properties.

The coated structure uses the ZA alloy as the core and the GO layer as the shell, and the PEEK is filled with a small amount of ZA alloy. On the premise of ensuring the excellent mechanical properties of the PEEK, this structure takes advantage of the high thermal conductivity, high strength and micro-size effect of the GO and the ZA alloy. In addition, the structure utilizes the GO coating to reduce the surface energy of the ZA alloy and improve the interface compatibility between the ZA alloy and the PEEK, thereby improving the thermal conductivity and tribological properties of the composite. In addition, the flake-like ZA alloy promotes the nucleation of PEEK crystals, thereby improving the crystallinity of the material, and improving the heat resistance of the composite.

The PEEK composite provided by the invention has excellent thermal properties and tribological properties. The thermal conductivity of the composite is as high as 0.4387 W/(m·K), the friction coefficient is only about 0.12-0.18, and the wear loss is reduced to about 5-8 mg.

The PEEK composite of the invention has a wide range of applications and outstanding application value. It can be applied to a variety of wear-resistant parts such as sliders and bushings in the fields of aerospace, semiconductors, auto parts, petrochemicals, machinery, medical treatment, electronic appliances, etc.

DETAILED DESCRIPTION OF THE PREFERRED EMBODIMENT(S)

In order to help understand the invention, the invention is further described below with reference to the examples. The examples are merely intended to illustrate the invention, rather than to constitute a limitation to the invention in any way.

Example 1

90.5 parts by mass of zinc, 8.6 parts by mass of aluminum, 1.1 parts by mass of copper, and iron and magnesium impurities included in each material were made into zinc aluminum (ZA) alloy powder by a smelting-nitrogen atomization method. Then, flake-like alloy powder was prepared by a wet ball milling method. The melting point of the ZA alloy was controlled at 360-400° C.

5 parts by mass of the prepared flake-like ZA alloy powder were added into 0.3 mol/L aqueous solution of cetyl dimethyl ammonium bromide. The ZA powder was ultrasonically dispersed for more than 30 min, filtered, washed with deionized water, heated to 100-110° C., stirred and dried for 10-15 min until the water content thereof was less than 0.3%. Then the ZA alloy powder was put into a high-speed mixer, where an aluminate coupling agent DL-411 that was 0.8 wt % of the ZA alloy powder was added, and the materials were blended for 3 min.

0.3 parts by mass of graphene oxide (GO) were ultrasonically dispersed for more than 3 h and dissolved in deionized water, where the concentration of the GO was 0.01 g/mL. The ZA alloy processed in the above step was ultrasonically dispersed in deionized water to obtain a ZA alloy dispersion with a concentration of 0.1 g/ml. A GO solution was added dropwise to the ZA alloy dispersion under stirring and was filtered and dried after the solution is stratified, to obtain a GO/ZA alloy complex. The GO was prepared by oxidation-exfoliation of graphite by a Hummers method.

55 parts by mass of polyetheretherketone (PEEK), the GO/ZA alloy complex obtained in the above step, 5 parts by mass of graphite and 0.1 parts by mass of polytetrafluoroethylene (PTFE) were mixed, and then dried at 120° C. for 3 h.

The materials were mixed in a mixer, and were subjected to compression molding at 380-400° C.

Example 2

91.1 parts by mass of zinc, 8.5 parts by mass of aluminum, 1.2 parts by mass of copper, and iron and magnesium impurities included in each material were made into ZA alloy powder by a smelting-nitrogen atomization method. Then, flake-like alloy powder was prepared by a wet ball milling method. The melting point of the ZA alloy was controlled at 360-400° C.

30 parts by mass of the prepared flake-like ZA alloy powder were added into 0.7 mol/L aqueous solution of octadecyl trimethyl ammonium chloride. The ZA powder was ultrasonically dispersed for more than 30 min, filtered, washed with deionized water, heated to 100-110° C., stirred and dried for 10-15 min until a water content thereof is less than 0.3%. Then the ZA alloy was put into a high-speed mixer, where an aluminate coupling agent DL-411 that was 1.2 wt % of the ZA alloy powder was added, and the materials were blended for 5 min.

1 part by mass of GO was ultrasonically dispersed for more than 3 h and dissolved in deionized water, where the concentration of the GO was 0.01 g/mL. The ZA alloy processed in the above step was ultrasonically dispersed in deionized water to obtain a ZA alloy dispersion with a concentration of 0.1 g/ml. A GO solution was added dropwise to the ZA alloy dispersion under stirring and was filtered and dried after the solution stratified, to obtain a GO/ZA alloy complex. The GO was prepared by oxidation-exfoliation of graphite by a Hummers method.

90 parts by mass of PEEK, the GO/ZA alloy complex obtained in the above step, 15 parts by mass of graphite and 0.2 parts by mass of antioxidant 1010 were mixed, and then dried at 100° C. for 4 h.

The materials were mixed in a mixer, and were subjected to compression molding at 380-400° C.

Example 3

91 parts by mass of zinc, 8.55 parts by mass of aluminum, 1.15 parts by mass of copper, and iron and magnesium impurities included in each material were made into ZA alloy powder by a smelting-nitrogen atomization method. Then, a flake-like alloy powder was prepared by a wet ball milling method. The melting point of the ZA alloy was controlled at 360-400° C.

20 parts by mass of the prepared flake-like ZA alloy powder were added into 0.5 mol/L aqueous solution of dodecyl dimethyl benzyl ammonium chloride. The ZA powder was ultrasonically dispersed for more than 30 min, filtered, washed with deionized water, heated to 100-110° C., stirred and dried for 10-15 min until a water content thereof is less than 0.3%. Then the ZA alloy was put into a high-speed mixer, where an aluminate coupling agent DL-411 that was 1 wt % of the ZA alloy powder was added, and the materials were blended for 4 min.

0.6 parts by mass of GO were ultrasonically dispersed for more than 3 h and dissolved in deionized water, where the concentration of the GO was 0.01 g/mL. The ZA alloy processed in the above step was ultrasonically dispersed in deionized water to obtain a ZA alloy dispersion with a concentration of 0.1 g/ml. A GO solution was added dropwise to the ZA alloy dispersion under stirring and was filtered and dried after the solution stratified, to obtain a GO/ZA alloy complex. The GO was prepared by oxidation-exfoliation of graphite by a Hummers method.

75 parts by mass of PEEK, the GO/ZA alloy complex obtained in the above step, 10 parts by mass of graphite, 0.3 parts by mass of silicon oil and 0.2 parts by mass of antioxidant 168 were mixed, and then dried at 110° C. for 3.5 h.

The materials were mixed in a mixer, and were subjected to compression molding at 380-400° C.

The thermal deformation temperature, friction coefficient, wear loss, thermal conductivity, tensile strength, and impact strength of the PEEK composites obtained in each example and the PEEK were tested. The test results are shown in the following table.

| Items | PEEK | PEEK composites of Examples |
|---|---|---|
| Thermal deformation temperature (° C.) | 145 | 160-169 |
| Friction coefficient | 0.41 | 0.12-0.18 |

-continued

| Items | PEEK | PEEK composites of Examples |
|---|---|---|
| Wear loss (mg) | 12.8 | 5-8 |
| Thermal conductivity W/(m · K) | 0.2014 | 0.2665-0.4387 |
| Tensile strength (MPa) | 90 | 72-145 |
| Impact strength (KJ/m$^2$) | 9.8 | 10.1-19.5 |

The test results show that the tribological properties, thermal conductivity and mechanical properties of the PEEK composite obtained in the examples are significantly better than those of pure PEEK.

In the invention, the thermal deformation temperature was tested according to ASTMD648 *Standard Test Method for Deflection Temperature of Plastics Under Flexural Load in the Edgewise Position*; the friction coefficient was tested according to GB 10006-1988 *Plastics—Film and Sheeting—Determination of the Coefficients of Friction*; the wear loss was tested according to GB/T 12444.1-1990 *Metallic Materials—Wear Tests—MM Mode Wear Test*; the thermal conductivity was tested according to ASTM D5470 *Standard Test Method for Thermal Transmission Properties of Thermally Conductive Electrical Insulation Materials*; the tensile strength was tested according to GB/T1040-2008 *Plastics—Determination of Tensile Properties*; the impact strength was tested according to GB/T1043.1-2008 *Plastics—Determination of Charpy Impact Properties*.

The invention is not limited to the above preferred embodiments. Various changes and improvements may also be made within the spirit defined by the claims and specification of the invention. Such changes and improvements can solve the same technical problems and achieve the expected technical effects and are thus within the scope of the invention. All the solutions that those of ordinary skill in the art could conceive based on the disclosure of the invention are within the spirit defined by the claims and within the scope of the invention.

What is claimed is:

1. A polyetheretherketone (PEEK) composite, wherein the PEEK composite is prepared from about 55-90 parts by mass of PEEK, about 5-30 parts by mass of zinc aluminum (ZA) alloy, about 5-15 parts by mass of graphite, about 0.3-1 parts by mass of graphene oxide (GO) and a processing additive; the ZA alloy is prepared from the following raw materials: about 90.5-91.1 parts by mass of zinc, about 8.5-8.6 parts by mass of aluminum, about 1.1-1.2 parts by mass of copper, and trace amounts of iron and magnesium impurities; the ZA alloy is present in the PEEK composite as a flake-like alloy powder, and the flake-like alloy powder is made by making the raw materials into powder by a smelting-nitrogen atomization method, and then making the powder into the flake-like alloy powder by a wet ball milling method; a melting point of the ZA alloy is 360-400° C.; the PEEK composite is prepared by the following steps:

putting the flake-like ZA alloy powder into an aqueous solution of a quaternary ammonium salt surfactant, ultrasonically dispersing for more than 30 min, filtering, washing with deionized water and drying;

ultrasonically dispersing and dissolving the GO in deionized water to obtain a GO solution, ultrasonically dispersing the ZA alloy processed by the above step in deionized water to obtain a ZA alloy dispersion, and adding the GO solution dropwise to the ZA alloy dispersion under stirring to obtain a GO and ZA alloy composite solution, and after the GO and ZA alloy composite solution is stratified, filtering the GO and ZA alloy composite solution to obtain a filter residue, and drying the filter residue, to obtain a GO/ZA alloy complex;

mixing the PEEK, the GO/ZA alloy complex, the graphite and the processing additive to obtain a mixture, and drying the mixture at 100-120° C. for 3-4 h to obtain a dried material; and mixing the dried materials in a mixer to obtain a mixed material, and carrying out compression molding on the mixed material at 380-400° C.

2. The PEEK composite according to claim 1, wherein the GO is prepared by oxidation-exfoliation of graphite by a Hummers method.

3. The PEEK composite according to claim 1, wherein the GO is ultrasonically dispersed for more than 3 h and dissolved to a concentration of 0.01 g/mL.

4. The PEEK composite according to claim 1, wherein the processing additive comprises at least one of a lubricant and an antioxidant; the lubricant comprises 0.2-0.3 parts by mass of silicone oil or/and 0.2-0.3 parts by mass of polytetrafluoroethylene (PTFE); the antioxidant comprises 0.1-0.2 parts by mass of pentaerythritol tetrakys 3-(3,5-ditert-butyl-4-hydroxyphenyl)propionate or/and 0.1-0.2 parts by mass of tris-(2.4-di-tert-butyl)-phosphite.

5. The PEEK composite according to claim 1, wherein the preparation of the PEEK composite further comprises the following steps: heating the ZA alloy powder washed by deionized water to 100-110° C., stirring and drying for 10-15 min until a water content of the ZA alloy is less than 0.3%, putting the ZA alloy into a high-speed mixer, adding an aluminate coupling agent that is 0.8 wt % to 1.2 wt % of the ZA alloy powder, and blending the ZA alloy and the aluminate coupling agent for 3-5 min.

6. The PEEK composite according to claim 1, wherein the PEEK, the GO/ZA alloy complex, the graphite and an appropriate amount of processing additive are dried at 120° C. for 3 h after being mixed.

7. A polyetheretherketone (PEEK) composite, wherein the PEEK composite comprises about 55-90 parts by mass of PEEK, about 5-30 parts by mass of a zinc aluminum (ZA) alloy, about 5-15 parts by mass of graphite, about 0.3-1 parts by mass of graphene oxide (GO) and a processing additive; wherein the ZA alloy comprises about 90.5-91.1 parts by mass of zinc, about 8.5-8.6 parts by mass of aluminum, about 1.1-1.2 parts by mass of copper, and trace amounts of iron and magnesium impurities.

8. The PEEK composite according to claim 1, wherein the ZA alloy is a powder made by a smelting-nitrogen atomization method, and then processed into a flake-like alloy powder made by a wet ball milling method.

9. The PEEK composite according to claim 1, wherein a melting point of the ZA alloy is 360-400° C.

* * * * *